Oct. 26, 1971          E. A. RICHARDSON          3,614,985
      PLUGGING A SUBTERRANEAN FORMATION BY HOMOGENEOUS
                    SOLUTION PRECIPITATION
                   Filed March 30, 1970

INVENTOR:
EDWIN A. RICHARDSON

United States Patent Office 3,614,985
Patented Oct. 26, 1971

3,614,985
PLUGGING A SUBTERRANEAN FORMATION BY
HOMOGENEOUS SOLUTION PRECIPITATION
Edwin A. Richardson, Houston, Tex., assignor to
Shell Oil Company, New York, N.Y.
Filed Mar. 30, 1970, Ser. No. 23,550
Int. Cl. E21b 33/138
U.S. Cl. 166—294                                    10 Claims

ABSTRACT OF THE DISCLOSURE

A process for plugging an earth formation by injecting fluid that forms a plugging material within the formation is improved by injecting an aqueous solution containing both a dissolved salt of a metal that precipitates as a gelatinous, hydrous or hydrated metal oxide or hydroxide at a pH higher than that of the solution and a dissolved material that reacts within the solution and raises the pH of the solution.

BACKGROUND OF THE INVENTION

This invention relates to decreasing the permeability of a selected portion of a subterranean earth formation. More particularly, it relates to preferentially decreasing the permeability of the more permeable one of several earth formations that communicate with the borehole of a well.

Wells are usually drilled through a reservoir interval containing earth formations of different permeabilities. The wells are often lined with casing and cement through which perforations are opened along some or all of the reservoir interval or equipped with a screen or liner that is surrounded by sand or gravel. It is usually desirable to flow fluid into or out of a reservoir interval so that the flow is about equal in all layers of the interval. If the permeability of one layer is anomalously high, the rate of fluid entry into the reservoir interval is highest in the most permeable layer. Such a layer of anomalously high permeability is commonly referred to as a "thief zone."

Numerous processes have been proposed for reducing the permeability of a thief zone. Treatments such as injection of a cement slurry or a resin-forming fluid are used where the well equipment can be arranged to provide a fluid-confining conduit that communicates only with the thief zone.

Where a well contains a sand or gravel pack or where a vertical flow of fluid may occur behind a perforated casing, it is difficult to ensure that the openings which are plugged with cement or resin are confined to those in or leading to the thief zone. In such a situation an injected fluid tends to be injected into all layers of a reservoir interval. The rates at which it enters the individual layers are functions of the relative permeabilities of the layers, the effective viscosity of the fluid and the injection pressure gradient. When a slug of fluid is injected, most of it will enter the zone having the largest kH (product of effective permeability times the thickness of the layer of that permeability). If equal slugs of fluids of different viscosities are injected under the same conditions, the amounts of the two fluids that are contained in individual portions of the reservoir interval are apt to be significantly different. This tendency provides a severe disadvantage regarding any treatment for decreasing the permeability of a thief zone that depends on an injection of a plurality of fluids that have different viscosities but must contact each other within the earth formations.

A well treatment for plugging a thief zone that avoids the above disadvantages comprises an injection of activator and plating solutions for effecting an electroless metal plating as described in a copending and commonly assigned patent application by E. A. Richardson and R. C. Ueber, Ser. No. 817,722, filed Apr. 21, 1969. In that treatment the viscosities of the injected slugs of fluid are substantially equal to that of water. Such a treatment is particularly effective in a reservoir interval in which there is a limited amount of vertical permeability. However, since the metal plated plugs tend to form very near the borehole, such plugs tend to be bypassed in a reservoir interval in which the vertical permeability is relatively high.

U.S. Pat. 3,435,899 describes an earth formation plugging process in which the injected fluid is a sodium silicate solution containing a polyvalent metal ion complex which will decompose or break down to release the polyvalent metal ion slowly. The releasing of the metal ions forms a precipitate comprising a gelled silicate. The gelled silicate plugging materials are soluble to a significant extent in various moderately alkaline fluids which are apt to be present in or injected into a subterranean oil reservoir.

SUMMARY OF THIS INVENTION

This invention improves a process for reducing the permeability of an earth formation by injecting a fluid that forms a plugging material within the earth formation. In accordance with this invention, the injected fluid is an aqueous solution that has a relatively low pH and contains a dissolved salt of a metal that forms a gelatinous, hydrous or hydrated metal oxide or hydroxide at a higher pH and a dissolved material that reacts within the solution to raise the pH of the solution. This procedure forms a plugging material which has an extremely low solubility in substantially any moderately alkaline aqueous fluid apt to be encountered in a subterranean earth formation.

The gelatinous, hydrous or hydrated metal oxides or hydroxides that are formed in the present process are compounds having a relatively poorly defined structure of the general formula $M_2O_3 \cdot XH_2O$ where M is a polyvalent metal, such as a transition metal, and X is a measure of the water which is held more or less tightly by hydration with the metal oxide. Such oxides also tend to contain water that is held relatively loosely by adsorption. For convenience, such compounds are usually referred to herein as metal hydroxides or hydrated metal oxides.

DESCRIPTION OF THIS INVENTION

Figure 1:
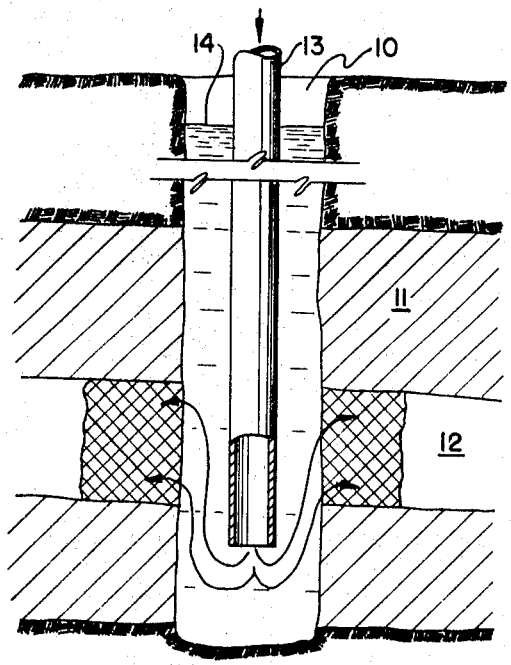
FIG. 1 is a vertical section schematic illustration of a well being treated in accordance with this invention through a tubing string.

The plug-forming solution of the present invention comprises a homogeneous solution consisting essentially of water and the dissolved metal salt and reactive material of the specified types. Such a solution can contain numerous other ingredients as long as they do not interfere with the functions of the above components. For example, where the thief zone is vugular or contains relatively large pores, the plug-forming solution can advantageously contain a suspension of finely divided solid materials such as crushed sand grains, carbonates, etc., to aid in the reduction of the permeability. Where the thief zone contains a water-sensitive clay, clay-stabilizing agents such as neutral salts, amines, amine salts, etc., can be added. Where desired, for example, in view of the particular distribution of the thicknesses and permeabilities of the individual layers within the reservoir interval, the plug-forming solution can contain thickening agents such as carboxymethyl cellulose, polyacrylamides, etc.

Polyvalent metal salts suitable for use in this invention comprise substantially any such salt that is soluble in an aqueous solution of relatively low pH and is precipitated in the form of a hydrated metal oxide from an aqueous solution of a moderately higher pH. Such salts are preferably soluble at a pH of from about 2 to 7 and precipitated at a pH of from about 7 to 10. The preferred salts are salts of metals which form gelatinous metal hydroxides or hydrated metal oxides of very low solubility. Such metals are typified by chromium, aluminum, iron, copper, bismuth, etc. The suitable salts of such metals are those that have a relatively high water solubility in solutions having a pH of from about 2 to 7, such as the chlorides, nitrates, acetates, etc., of such metals.

Reactive pH adjusting materials which are suitable for use in this invention comprise substantially any water-soluble compounds or mixtures which react within a water solution to produce water-soluble alkaline reaction products that increase the pH of the solution in a manner such that a polyvalent metal salt remains dissolved until the pH of the solution has reached the value at which a gelatinous hydroxide of the metal is precipitated. Suitable reactant materials include water-soluble amides of carbamic acid such as ammonium carbamate, carbonic acid halides, urea, salts of cyanic acid such as alkali metal cyanates, cyanamide, etc. Urea and potassium cyanate are particularly suitable reactants which increase the pH of an aqueous solution by producing ammonium hydroxide at rates which are suitable for use at various temperatures that are commonly encountered in subterranean earth formations to be treated.

The concentration of both the polyvalent metal salt and the pH adjusting reactant can be varied over relatively wide limits. In either case, the proportion can range from about 0.1% by weight to an amount which may be as high as from about 30 to 50%, that forms a saturated solution.

Where desirable, a buffer system, such as a dissolved mixture of a weak acid and its salt of a strong base can be used to facilitate and/or control the adjustment of the pH of the solution. For example, a substantially equimolar mixture of acetic acid and sodium acetate will maintain a pH of from about 4.5 to 5.0 as long as both of its components are present. Such a mixture can be used to extend the time required for the ammonia released by the hydrolysis of urea to raise the pH of the solution. The first portions of the ammonia are used up in depleting the components of the buffer and the attainment of a pH of, e.g., 7 is delayed by the time required to overcome the buffering effect.

Where the pH of an aqueous solution of a particular polyvalent metal salt tends to be too low it can be increased by adding an alkaline material. For example, the pH of an aqueous solution of aluminum chloride is preferably increased by the addition of a hydroxide such as an ammonium, sodium and/or potassium hydroxide, to a value of about 4.

For treatments at relatively low temperatures, it has been found that potassium cyanate can be used to provide the controlled hydrolysis necessary for in-situ precipitation. For example, where aluminum salts are used as the source of metal ions to form the precipitate, it is desirable to prepare two separate solutions, one containing $AlCl_3$ and $NH_3$ (for pH adjustment) and the other containing the KCNO salt. These two solutions are pumped separately and blended just before the mixture enters the wellhead or a portion of the borehole near the earth formation to be treated. In this manner the hydrolysis of the KCNO is prevented (the pH is too high for significant hydrolysis to occur) until the mixing occurs and the pH drops to a value of about 4. At this pH the hydrolysis begins and when the pH rises above a critical value, a voluminous precipitate of hydrated aluminum oxide begins to form and is essentially complete by the time a pH of about 6.0 is reached. The reaction rates (controlled by pH and temperature) and flow rates are preferably adjusted so that the solution has penetrated into the earth formation to be treated to the desired distance from the well borehole before the precipitation begins.

FIG. 1 shows a well borehole 10, extending through an interval of permeable earth formation 11, containing a thief zone or layer 12 of anomalously high permeability. In such a well the borehole can advantageously be further equipped with a cemented and perforated casing string, not shown.

In practicing this invention, tubing string 13 is used to convey fluid through the well and into the thief zone as shown by the arrows. The annular space around tubing 13 is preferably closed in respect to an upward flow of fluid, for example, by means of conventional wellhead valve equipment, not shown, that is closed to provide a back pressure relative to such an upward flow of a fluid such as liquid 14 within the borehole 10.

In a preferred procedure, the specific gravity of the plugging fluid to be injected and the fluid in the borehole near the earth formations to be treated are adjusted to be substantially equal. For example, a well drilling or well completion fluid which is in the borehole during the completion of the well can be displaced by pumping in a brine through tubing 13 while allowing fluid to flow out through the annular space around that tubing string. The plug-forming solution can be formulated as an aqueous solution having a specific gravity substantially equal to that of the brine or other liquid 14 in the adjacent portion of the borehole.

Figure 2:
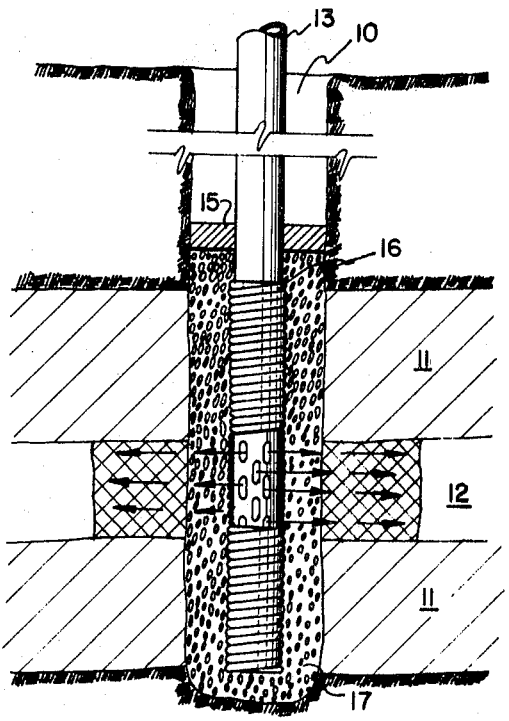
FIG. 2 is a similar view of a well being treated through a screen and gravel pack.

FIG. 2 shows a tubing string 13 extended through a packer 15, and connected to a wire-wrapped slotted liner 16 which is surrounded by a gravel packing material 17. In such an arrangement the present invention is practiced substantially as described above. The packer 15 can be used to close the annular space around tubing 13 relative to an upward movement of fluids so that the inflow of an injected plug-forming solution into the thief zone is substantially confined to the thief zone, where it finds the greatest permeability and the least resistance to fluid inflow.

Figure 3:
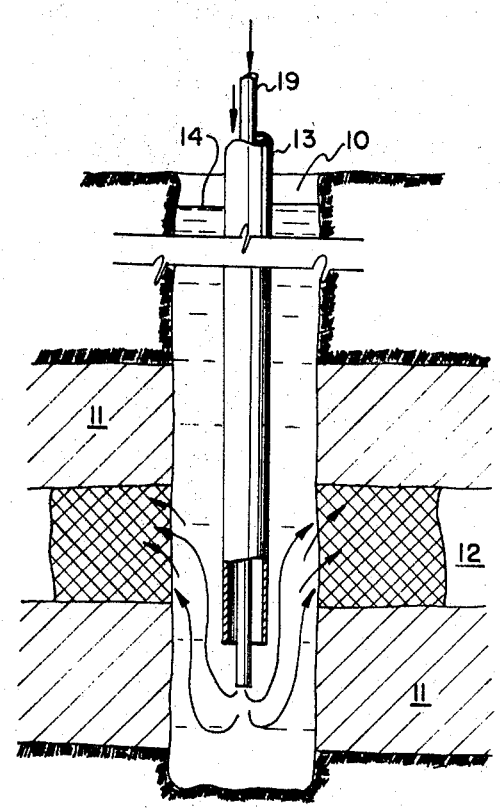
FIG. 3 is a similar view of a well being treated through a pair of concentric tubing strings.

FIG. 3 shows a tubing string 19 run in through a tubing string 13 to form a concentric pair of fluid-confining conduits extending to near the earth formations to be treated. This arrangement is particularly useful in using a pair of treatment solutions which are kept separate until just before they are injected into the earth formation to be plugged. It is particularly useful in using one solution containing a polyvalent metal such as aluminum and a pH-adjusting material such as ammonium and another solution containing a pH-raising reactant such as potassium cyanate which will begin to react at a significant rate when mixed with the solution containing the polyvalent metal salt and pH-adjusting material.

In general, the plug-forming solution used in the present process is injected into the earth formation to be treated by pumping the solution into the well at a rate providing a downhole pressure exceeding the fluid pressure within the adjacent earth formations. Various procedures can be used to adapt the process to a particular reservoir interval and/or combinations of reactants. For example, the plug-forming solution can be prepared as a relatively small slug, displaced into the earth formation and kept substantially static in the zone to be treated until the precipitation has occurred. Alternatively, a relatively large slug can be injected at a relatively slow rate so that the precipitate forms in portions of a solution that are flowing within the earth formation. Such a relatively continuous injection is continued in response to a relatively constant pressure until the rate of flow has been reduced by the plugging of the earth formation. Where the reservoir interval contains a thief zone having a permeability not much greater than that of, for example, an oil zone to be water-flooded, a combination of a relatively long-delayed precipitation and low rate of fluid injection can be used to minimize the plugging of the oil zone. This allows the plug-forming solution to be injected in response to a low pressure gradient that is just high enough to cause inflow into the thief zone but is low enough to cause only a very slow rate of flow into the oil zone. When such a low rate of injection is used with a relatively small slug, the amount of plug-forming fluid that enters the oil zone tends to be too small to cause an undesirable reduction in the permeability of the oil zone.

EXAMPLE I

A solution containing 3.75 g./l. $CrCl_3 \cdot 6H_2O$ + 30 g./l. urea + 17.5 cc./l. 3 percent $NH_3$ with pH=5.7 was prepared. This solution is one which remains clear for about 30 minutes at 190° F. and then suddenly forms an insoluble gel, presumed to be a hydrated metal oxide of the formula $Cr(OH)_3$.

A sandpack of No. 5 sand was prepared in a 1-inch glass tube, 12 inches long, with inlet and outlet fittings for flow lines and pressure gauges. The pore volume in this sandpack was about 62 cc. and is permeability was about 7.5 darcies. The sandpack was immersed in a waterbath at 193° F. and 50 cc. of water at pH=4.0 was pumped into the sand at about 75 p.s.i. The pressure was maintained throughout the test by a back pressure valve on the outlet.

At a flow rate of 0.875 cc./min. the above solution was pumped into the sandpack. It took about 30 minutes to displace the injected fluid into the initial ⅓ of the sandpack. After about 80 minutes the pressure drop across the sandpack started to increase above the initial value of 0.16 p.s.i. After 540 minutes (a total of ~470 cc. had been pumped) the pressure drop had increased to 0.51 p.s.i. and a zone of apple-green precipitate ($Cr(OH)_3$) could be seen between 3 to 4 inches from the inlet of the sandpack.

The overall permeability retained in the sandpack was, therefore, 0.16/0.51×100=32 percent of the original value (loss of permeability=68 percent).

A second 540-minute treatment (at 0.865 cc./min.) increased the loss of overall permeability to 81 percent and a similar third treatment increased the overall loss of permeability to 95 percent. All the precipitate remained concentrated in a zone about 1-inch thick between 3 and 4 inches from the inlet.

If all the plugging is assumed to be concentrated in the 1-inch thick zone containing the precipitate, the calculated permeability therein becomes 0.15/0.51×100/12=2.7 percent retained or 97.3 percent lost for first treatment, for the second treatment, 1.6 percent retained or 98.4 percent lost and for the third treatment, 0.42 percent retained or 99.58 percent lost in the assumed 1 inch of plugged sand.

It is apparent that (a) the permeability was reduced, (b) an initial reduction of permeability was supplemented by a second treatment of the same earth formation, and (c) the location of the zone in which the permeability reduction is concentrated is determined by the location of the frontal portion of the injected fluid at the time the pH of the plug-forming solution has been raised to the pH that initiates the precipitation of the hydrous metal oxide.

EXAMPLE II

A 1-inch diameter glass tube 3 feet in length was filled with well-sorted, fine, unconsolidated sand (permeability about 10 darcies) and fitted with inlet and outlet connections. A solution containing 15 g./l. $AlCl_3 \cdot 6H_2O$ + 120 cc./l. 3 percent $NH_3$ was blended with a solution containing 5 g./l. KCNO (pH≅7.5) at a rate of 0.45 cc. of each per minute in the inlet tubing of the sandpack. The entire system was maintained at 78° F.

After about 20 minutes the pressure drop across the pack began to increase. This pressure increase was measured with a mercury manometer between the outlet of the pack and a point about ½ inch downstream from the inlet (in this way any pressure drop across a solid filler cake on the inlet—which was considerable in this test—was not measured as an internal pressure drop). These results are shown below:

| Minutes after pumping-blending started | Pressure increase in the sandpack, p.s.i. |
| --- | --- |
| 0 | 0 |
| 9 | 0 |
| 33 | 0.018 |
| 57 | 0.064 |
| 94 | 0.141 |
| 233 | 0.168 |
| 266 | 0.191 |
| 379 | 0.173 |

It can be seen that the pressure drop increases steadily except for the last readings, which were probably influenced by unstable conditions of flow caused by a high pressure which built up at the inlet due to a small filter cake which formed.

EXAMPLE III

In the above examples, the earth formations in which the permeability was reduced had a high initial permeability. The treatment of a highly permeable 7.5 darcy sandpack with a solution containing aluminum, ammonia and cyanate was compared with a similar treatment of a core sample of a Berea sandstone which had a limited permeability of only 0.5 darcy. These treatments were conducted at 192° F. (substantially as described in Example II) with about 5 percent by weight of sodium chloride being dissolved in the treatment solution in order to provide a clay-stabilizing agent for preventing water-swelling of water-sensitive clays in the core. The flow rates of the injected solutions were 0.400 fluid per minute/cm.² of flow cross section.

In the highly permeable sand the plugging began almost immediately upon the beginning of the formation of a precipitate in the plug-forming solution. The tests indicated that almost 90 percent of the equivalent injectivity of such a sand can be removed before any significant amount of plugging occurs in a relatively tight earth formation such as the Berea core. Thus, in a reservoir interval in which the highly permeable sand is representative of a thief zone and the Berea core is representative of an oil-productive layer to be water-flooded, the injection profile could be normalized without the necessity of mechanically isolating the two layers.

What is claimed is:

1. In a process for reducing the permeability of a subterranean earth formation by injecting through a well into that formation a fluid which forms a plugging material within the formation, the improvement which comprises:

formulating as said fluid an aqueous solution that (a) has a relatively low pH, (b) contains a dissolved salt of a metal that forms a precipitated gelatinous metal hydroxide at a higher pH, and (c) contains dissolved material that reacts within the solution to raise the pH of the solution to said higher pH; and injecting the aqueous solution into the earth formation to be treated before the pH of the solution has reached said higher pH.

2. The process of claim 1 in which said aqueous solution is formulated to have a specific gravity substantially equaling that of the fluid in the borehole of said well that opens into the formation to be treated.

3. The process of claim 1 in which a relatively small slug of said aqueous solution is injected into and kept relatively static within the earth formation to be treated before the pH of the solution has reached said higher pH.

4. The process of claim 1 in which said aqueous solution is injected at a relatively constant pressure until the rate of inflow has been reduced by the plugging of the earth formation to be treated.

5. The process of claim 1 in which said aqueous solution is formulated by conveying to near the earth formation to be treated a first aqueous solution of said dissolved salt having said relatively low pH and a second aqueous solution of said dissolved material, and mixing said solution in that location.

6. The process of claim 1 in which said aqueous solution contains a clay-stabilizing agent.

7. The process of claim 1 in which said aqueous solution contains chromium chloride and urea.

8. The process of claim 1 in which said aqueous solution contains aluminum chloride and potassium cyanate.

9. The process of claim 1 in which said aqueous solution contains chromium chloride and an alkali metal cyanate.

10. The process of claim 1 in which said aqueous solution contains aluminum chloride and urea.

References Cited
UNITED STATES PATENTS

| 2,156,220 | 4/1939 | Dunn | 166—292 |
| 2,238,930 | 4/1941 | Chamberlain et al. | 166—292 |

IAN A. CALVERT, Primary Examiner

U.S. Cl. X.R.

166—292, 300